Figure 1:
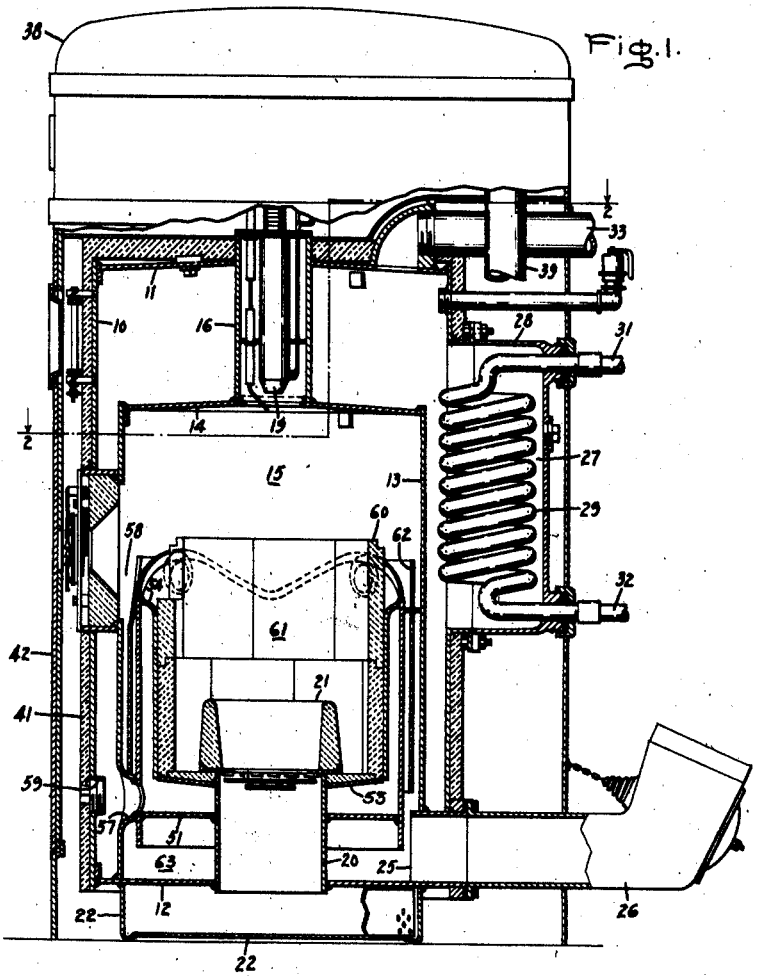

Nov. 10, 1942.    W. DALTON    2,301,683
OIL FURNACE BOILER
Filed Aug. 18, 1939    3 Sheets-Sheet 1

Inventor:
William Dalton,
by Harry E. Dunham
His Attorney.

Nov. 10, 1942. W. DALTON 2,301,683
OIL FURNACE BOILER
Filed Aug. 18, 1939   3 Sheets-Sheet 2

Inventor:
William Dalton,
by Harry E. Dunham
His Attorney.

Nov. 10, 1942.　　　　W. DALTON　　　　2,301,683
OIL FURNACE BOILER
Filed Aug. 18, 1939　　　3 Sheets-Sheet 3

Inventor:
William Dalton,
by Harry E. Dunham
His Attorney.

Patented Nov. 10, 1942

2,301,683

UNITED STATES PATENT OFFICE 2,301,683

OIL FURNACE BOILER

William Dalton, Schenectady, N. Y., assignor to General Electric Company, a corporation of New York Application August 18, 1939, Serial No. 290,825

9 Claims. (Cl. 122—161)

This invention relates to boiler furnaces, and has for its principal object an improved and simplified construction for obtaining increased heating capacity and efficiency, particularly in steam or hot water house heating systems.

Among the more specific objects are to provide a unitary house heating boiler furnace of fabricated construction that affords a maximum sized water backed combustion chamber with a minimum of material and hence, is lightweight and relatively inexpensive but strong and safe and can be easily handled and installed.

Another object is to provide an improved boiler of such construction that it is particularly adapted to have all the parts thereof welded into a single unit structure having a water backed combustion chamber and a secondary heat absorption passage, whereby a maximum of heat transfer area is provided with a minimum of overall size.

In accordance with the illustrated embodiments of my invention, I provide a boiler furnace having a combustion chamber substantially enclosed by a pair of complementary telescoped, or reversely nested annular tanks each provided with an inwardly offset annular end drum, the outer tank having a pair of spaced apart side walls and a pair of spaced apart upper end drum walls, the inner tank having a pair of spaced apart side walls and a pair of spaced apart lower end drum walls. Connections are provided between the inner side wall of the outer tank and the outer side wall of the inner tank to provide for circulation therebetween, the connections serving to space the two tanks apart to provide a substantially annular passage for the products of combustion which are withdrawn from a secondary heat exchange chamber in the lower portion of the furnace. Axially aligned conduit passages are provided through the end drum portions of the two tanks through which combustibles are supplied to the combustion chamber. The combustion zone within the chamber is defined by a refractory lining supported within the inner tank.

Further objects and advantages of my invention will become apparent as the following description proceeds, and the features of novelty which characterize my invention will be pointed out with particularity in the claims annexed to and forming a part of this specification.

Figure 2:
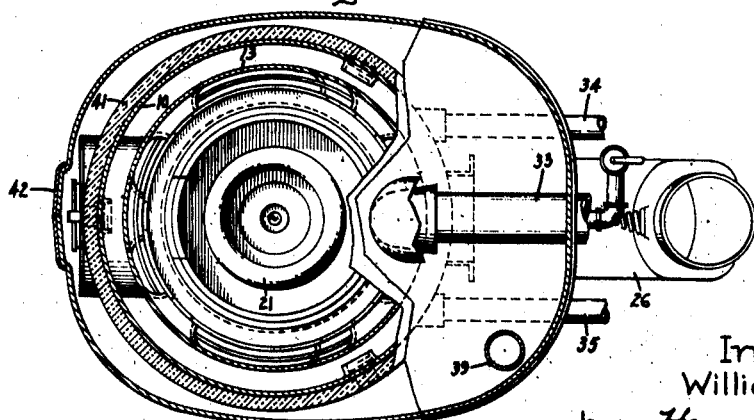
Figure 3:
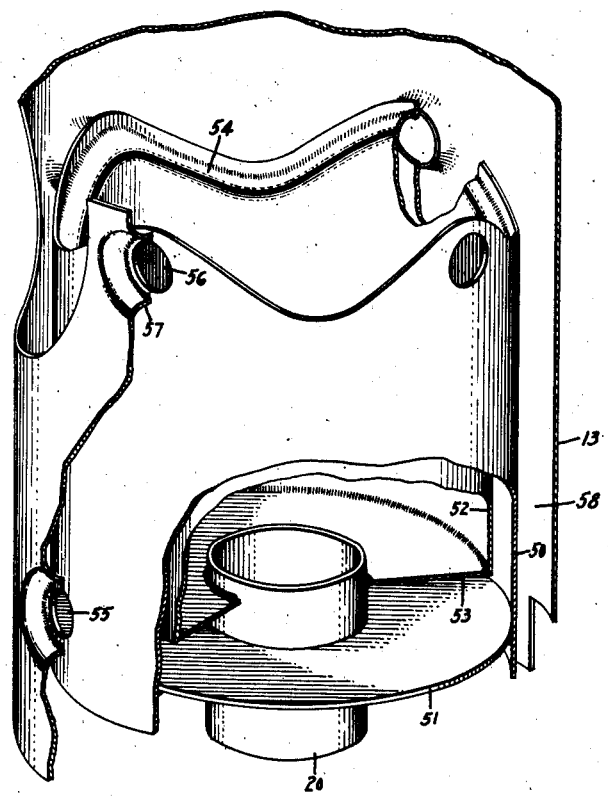
Figure 4:
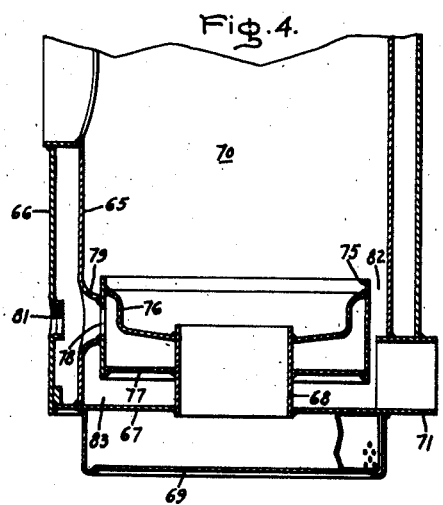
Figure 7:
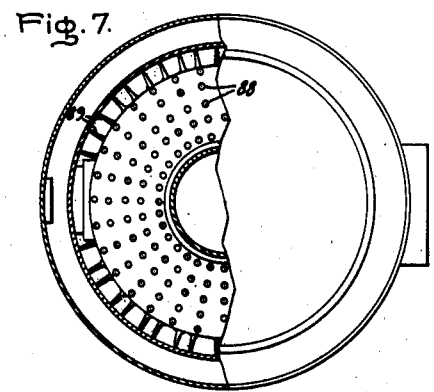
Figure 5:
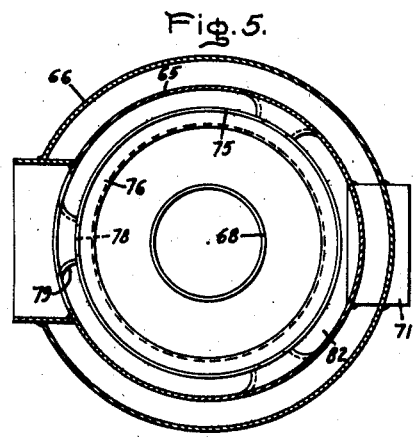
Figure 8:
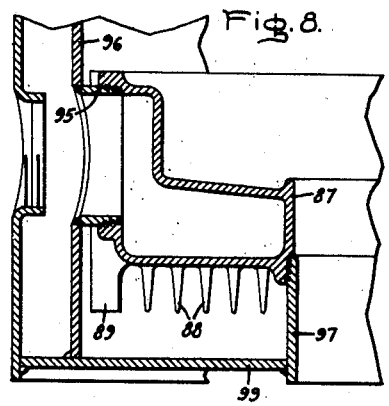
Figure 6:
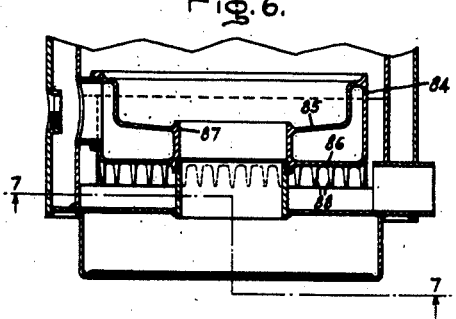
Figure 9:
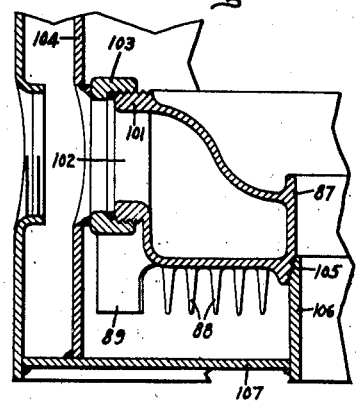

In the accompanying drawings, Fig. 1 is a side view of a vertical type oil burner furnace partially cut away to show the details of the boiler construction; Fig. 2 is a horizontal cross-sectional view on the line 2—2; Fig. 3 is an enlarged perspective view, partially in section, illustrating further structural details of an inner portion of the boiler; Fig. 4 is a fragmentary sectional view of a boiler illustrating a second modification of the invention; Fig. 5 is a horizontal cross-sectional view through the construction shown in Fig. 4 along the line 5—5; Fig. 6 is a fragmentary cross-sectional view of the furnace boiler illustrating a third modification of the invention; Fig. 7 is a horizontal view, partially in section, of the structure shown in Fig. 6 along the line 7—7; and Figs. 8 and 9 are fragmentary sectional views illustrating still further modifications of the invention.

Referring to Figs. 1 and 2 of the drawings, the primary or outer annular tank of the improved boiler furnace comprises a pair of concentric and spaced apart side walls and a pair of substantially parallel and spaced apart upper end drum walls. The outer side wall is formed by the shell 10 which, as shown, is of upright cylindrical shape and is closed at the upper end by the end drum plate 11 and at the lower end by the heat conducting end plate 12. These end plates preferably are joined to the rims of the shell 10 by welding, as indicated by the fillets in the drawings. The inner side wall or shell 13 is nested concentrically inside of the outer shell 10 and is joined to the bottom end plate 12 preferably by welding, as indicated by the fillet. This inner shell 13 also is of cylindrical shape with the upper end closed by the end drum plate 14 in spaced apart relationship with the upper end drum plate 11 of the outer shell to form an inwardly offset annular end drum, thus providing a water space over the top and around the sides of the combustion chamber 15 interiorly of the inner shell 13.

The tubular conduit 16 extends through the upper end drum of the outer tank and is welded to the edges of cooperating openings in the top end drum plates 11 and 14, thus strengthening and supporting these flat surfaces and also providing a passage centrally through the annular end drum into the combustion chamber 15 through which fuel may be fed. As indicated in the drawing, an oil burner atomizing nozzle 19 or any other suitable fuel feeding mechanisms may be mounted inside the conduit 16 which is axially aligned with the combustion chamber 15 so as to project the fuel centrally therein. A conduit 20 extends through a cooperating opening in the bottom end plate 12 in opposing axial alignment with the conduit 16. This passage permits the air nozzle 21 and the combustion air distributing box 22 to be arranged at the bottom of the combustion chamber in opposing relationship with the fuel feeding mechanisms 19 so that the method of combustion may be carried out which is described and broadly claimed in the Aldo Macchi Patent No. 2,022,512, issued November 26, 1935, and assigned to the General Electric Company, the assignee of the instant invention. In case this method of combustion is not to be used, then the fuel may be fed through conduit 16 and conduit 20 closed up, or the fuel and air fed through conduit 20 and conduit 16 eliminated.

The products of combustion are removed from the lower portion of the combustion chamber 15 through a conduit 25 extending through openings provided in the side walls 10 and 13. A flue pipe 26 is suitably fastened to the conduit 25 for conducting the gases to the chimney.

An auxiliary water chamber 27 is formed by the casing 28 which extends from the side of the outer shell 10 adjacent the top thereof downwardly to a point below the normal water level of the boiler. In the chamber 27 the domestic water heating coil 29 is arranged having connections 31 and 32 adapted to be connected to the conventional type of domestic hot water storage tank in the usual manner. The chamber 27 is in communication with the water space between the shells 10 and 13 so as to permit free circulation of the water or steam therethrough.

Hot water or vapor is adapted to be supplied from the boiler through the outlet 33 which is adapted to be connected to the house heating system. Return connections 34 and 35 are provided in the outer shell 10 adjacent the bottom thereof on either side of the flue pipe 26 so that one or the other, or both, may be connected to the return pipes of the heating system as found most convenient in installing the boiler.

Forming no part of the present invention, a suitable electric motor driven oil and air compressor unit (not shown) may be provided within the hood 38 for supplying oil and air to the atomizing nozzle 19. Low pressure combustion air is supplied from the blower of the unit through a suitably arranged pipe 39 to the air box 22 at the bottom of the furnace from which it passes through the conduit 20 and the air nozzle 21 into the combustion chamber.

The boiler furnace is preferably provided with a heat insulating covering 41 extending around the sides and over the top of the outer tank. This heat insulating covering is enclosed within an outer metal jacket or covering 42 which is arranged to be fitted around the boiler furnace to provide a pleasing and durable outer cover.

The secondary or inner tank of the boiler furnace is of the same general annular shape with an inwardly offset annular end drum as the outer tank and is reversely nested within the outer tank in the lower end of the combustion chamber. It comprises a pair of concentric and spaced apart side walls and a pair of substantially parallel and spaced apart lower end walls for the inwardly offset end drum. The structural details of the inner tank are more clearly illustrated in the perspective view of Fig. 3. This tank comprises an outer side wall or shell 50 which, as shown, is of cylindrical shape and is closed adjacent the lower end by the lower end plate 51 which is welded thereto. The inner side wall is formed by the cylindrical shell 52 which is concentric with and spaced apart from the outer shell 50. A horizontal plate 53 is welded across the lower end of the inner shell, which plate is substantially parallel with the plate 51 and is spaced therefrom to form the inwardly offset annular end drum. Aligned openings are provided in the center of the plates 51 and 53 for the accommodation of the upper end of the conduit 20 which is welded to the plates. The upper end of the inner tank may be closed in any suitable manner, such as by welding the outwardly bent edge 54 of the inner shell to the edge of the outer shell substantially as shown. The inner tank is suitably connected to the outer tank at a plurality of points to permit the free circulation of water and steam therebetween. A plurality of circumferentially spaced apart holes 55 are provided in the outer wall 50 adjacent the lower end of the tank, while a plurality of similarly spaced apart holes 56 are provided adjacent the upper end thereof. A plurality of corresponding openings are provided in the inner shell 13 of the outer tank, the edges of which openings are deformed outwardly, as indicated at 57, so as to substantially engage with the outer side wall of the inner tank about the holes 55 and 56 to provide conduit connections extending therebetween. The portions 57 of the shell 13 may be welded to the outer wall 50 of the inner tank around the corresponding aligned openings, thus spacing and securing the inner tank concentrically within the inner shell of the outer tank. An annular passage 58 is thus provided between the tanks through which passage the products of combustion may pass from the combustion chamber 15 to the flue connection. It will be noted that the openings 56 are arranged within portions of the inner tank which are somewhat higher than the intermediate sections so that the openings 56 are placed at portions the height of which is substantially a maximum so as to facilitate the escape of steam from the inner to the outer tank. Threaded openings 59 are provided in the outer tank shell 10 in alignment with the openings 55 so that the inner tank may be easily flushed if necessary after a period of service. The openings may be closed by cooperating threaded plugs.

A refractory lining 60 of ceramic blocks is provided around the outer surface of the inner tank walls 52 and 53 to form a high temperature combustion zone 61 for the combustibles admitted to the furnace. After complete combustion has taken place within this zone, the products of combustion pass upwardly and outwardly into contact with the various water backed surfaces which extract heat therefrom. The products of combustion then pass downwardly through the annular passage 58 and into a secondary heat extraction chamber 63 provided between the bottom plate 12 of the outer tank and the bottom plate 51 of the inner tank. A steel cylinder 62 is suspended within the passage concentric with and spaced from the adjacent tank walls 13 and 50, which cylinder materially assists in the extraction of heat from the products of combustion, the heat absorbed by the cylinder 62 being in turn radiated outwardly to the adjacent tank walls. The products of combustion passing from the annular passage 58 into the lower or secondary heat exchange chamber 63 give up additional heat to the water backed heat conducting bottom plate 51 of the inner tank and to the bottom plate 12. That heat absorbed by the plate 51 is transferred directly to the water within the inner tank, while that heat absorbed by the bottom plate 12 is partially conducted to the water in the outer tank and partially radiated from the opposite side thereof to be carried by the air circulated through the box 22 back into the combustion chamber of the furnace through the conduit 20.

It will be noted that the opposingly arranged and reversely nested complementary inner and outer tanks substantially surround the combustion chamber, while the high temperature combustion zone is in particular surrounded by the side walls of the inner tank. The flue outlet is separated from the combustion zone in such a manner that the products of combustion must pass in close proximity to relatively large areas of water backed surfaces which will effectively and efficiently extract the heat therefrom. Fire tubes and the like are thus eliminated with resultant savings in manufacturing and upkeep costs without a sacrifice of efficiency or boiler capacity.

In Figs. 4 and 5 is illustrated a further modification of the invention in which the inner tank is of a relatively lower height than that previously described and is of a correspondingly smaller capacity. The outer tank is of substantially the same design as that described above and comprises inner and outer side walls 65 and 66, respectively, and a bottom plate 67. A pipe 68 is welded in an opening in plate 67 and provides an axial passage from the air box 69 into the combustion chamber 70 of the furnace. A flue connection 71 extends through the walls 65 and 66 adjacent the bottom plate 67. The inner tank in this instance comprises an outer cylindrical wall 75, and upper and lower plates 76 and 77, respectively, welded thereto at their outer edges. Aligned openings are provided at the centers of these plates for the reception of the pipe 68, the pipe 68 being welded to the plates 76 and 77 around the openings as indicated. A plurality of circumferentially spaced apart holes 78 are provided in the outer wall 75 around which the bent out portions 79 of the outer tank shell 65 may be welded to provide connections for the circulation of water between the inner and outer tanks. Openings 81 may be provided in the outer shell 66 of the outer tank in alignment with the holes 78 leading into the inner tank whereby the inner tank may be flushed out periodically, if desired. These openings 81 may be threaded for the reception of suitable closing plugs (not shown).

The bent out portions 79 of the outer tank wall 65 act to space the inner tank from the outer tank so as to provide an annular passage 82 extending therebetween. A cylindrical arrangement of refractory material (not shown) may be mounted on the upper plate 76 of the inner tank to provide a high temperature combustion zone similar to that described in connection with Fig. 1. The lower end of the passage 82 communicates with the secondary chamber 83 provided between the inner tank plate 77 and the bottom plate 67. This chamber, as in the previous modification, being separated from the combustion chamber 70 by the restricted passage 82 presents relatively large heat absorbing areas to the products of combustion leaving the combustion chamber proper whereby the temperature thereof is economically reduced before they are discharged through the flue connection.

Because of the relatively short length of the annular passage 82 of this modification and the correspondingly relatively small area of water backed surfaces between the combustion chamber proper and the secondary heat extraction chamber 83, the temperature of the products of combustion entering the chamber 83 may be greater than can be satisfactorily reduced by the heat exchanging surfaces defining the chamber 83. To provide against this contingency it is preferred to provide the lower wall 77 of the inner tank with a plurality of depending plates, fins, or other suitable projections which will absorb additional heat from the products of combustion flowing through the chamber 83. Because of the relatively large amount of welding that would be required to secure such surface extensions to the steel tank plate 77, I prefer, for reasons of manufacturing economy, to cast the inner tank with heat absorbing fins formed integrally with the bottom wall. Referring to Figs. 6, 7 and 8, an inner tank is shown of somewhat the same configuration as that illustrated in Fig. 4. The inner tank in this instance comprises an outer cylindrical wall 84 and upper and lower walls 85 and 86, respectively. A passage for combustion air is provided through the central portion of the tank by the cylindrical wall 87. The lower wall 86 of the inner tank in this instance is provided with a plurality of depending heat absorbing fins or pins 88 which may, of course, be cast integrally with the lower wall in any desired form or shape. Additional vertical fins 89 may be cast integrally with the side wall 84 for spacing the tanks apart as well as for providing additional heat transfer surface. Since the inner tank in this instance is of cast metal while the outer tank will be preferably fabricated of steel plate, as previously described, particular consideration must be given to the manner for securing the two tanks together. In Figs. 8 and 9 are shown two modifications of ways in which this may be expediently accomplished. Referring to Fig. 8, short steel tubular sections 95 are homogeneously united with the castings, the sections 95 having been properly placed within the mold prior to the pouring of the molten metal thereinto. Due to the heat of the molten metal, the end of the steel section 95 exposed thereto will fuse with the casting. The other end of the pipe sections may then be readily welded around cooperating openings provided in the outer tank shell 96. Similarly, a steel pipe section 97 may be cast into the central wall 87 of the casting, which pipe section may be welded into a cooperating opening in the outer tank bottom plate 99 to provide an air passage from the air box into the combustion chamber of the furnace.

According to the modification illustrated in Fig. 9, circular flanged portions 101 are provided around the openings 102 of the inner tank side wall. These flanged portions may be threaded for cooperatively receiving a bushing 103 of a suitable metal which may be readily welded, as indicated, to the outer tank side wall 104. Similarly, the inner wall 87 of the inner tank may be threaded, as indicated, at 105 for cooperatively receiving a pipe section 106, which pipe section may be welded, as previously described, to the outer tank bottom wall 107.

Having described the principle of my invention together with the forms which I now consider to represent the best embodiments thereof, I desire to have it understood that the invention may be carried out by means other than those specifically illustrated and described.

What I claim as new and desire to secure by Letters Patent of the United States is:

1. In a boiler furnace having a combustion chamber, a pair of concentric nested annular water tanks surrounding the combustion chamber and spaced apart to provide an annular passage for the products of combustion therebetween and each having an inwardly offset annular end drum to provide axially aligned opposing passages for combustibles and air into said combustion chamber, conduit means extending between said tanks to provide for fluid circulation therebetween, a heat conducting end plate for the outer tank extending in spaced apart relation with the end drum of the inner tank to form therewith a heat exchange chamber communicating with said annular passage, and a flue connection communicating with said heat exchange chamber.

2. A boiler furnace comprising means for forming a water backed combustion chamber including a pair of concentric nested annular sheet metal tanks substantially surrounding the combustion chamber and each having an inwardly offset annular end drum to provide opposing aligned passages extending axially through the ends of said tanks for providing inlets for combustibles and air to said combustion chamber, the side walls of said tanks being spaced apart to provide an annular outlet passage for the products of combustion from said combustion chamber, connections extending between the adjacent side walls of said pair of nested tanks to provide for fluid circulation therebetween, a heat conducting end plate for said outer tank extending in spaced apart relation with the end drum of said inner tank to form therewith a heat exchange chamber communicating with said annular outlet passage, and a flue connection extending from said heat exchange chamber through said outer tank.

3. A boiler furnace having a combustion chamber, a first tank having a cylindrical inner side wall surrounding said combustion chamber and an upper end wall defining the upper end of said combustion chamber, a second tank having a cylindrical outer side wall extending parallel with and adjacent to said inner side walls of said first tank, said second tank having an end wall defining the lower end of said combustion chamber, conduit connections between the adjacent side walls of said first and said second tanks to provide for fluid circulation therebetween, said connections spacing said tanks apart to provide an annular passage therebetween, aligned passages extending through the end walls of said first and said second tanks to provide inlets for combustibles and air to said combustion chamber, spaced apart bottom plates extending across the lower end of said first and said second tanks defining a chamber, passages between said annular chamber and said last-mentioned chamber, and means for collecting and withdrawing the products of combustion from said combustion chamber through the said annular passage and said last-mentioned chamber, said last mentioned chamber surrounding a portion of one of said aligned passages so that heat from the products of combustion passing through said last mentioned chamber may be given up to the air passing through said one of said aligned passages.

4. In a boiler furnace having a combustion chamber, a pair of telescopically nested tanks substantially enclosing said combustion chamber, the outer of said pair of tanks defining the sides and the upper end of said combustion chamber, the inner of said pair of tanks defining the lower end of said combustion chamber, connections extending between the adjacent side walls of said pair of tanks for permitting fluid circulation therebetween, said connections spacing said tanks apart to provide outlet passages for the products of combustion from said combustion chamber, a chamber provided below said inner tank and in communication with said annular passage, means for withdrawing the products of combustion from said last mentioned chamber, and a metallic plate suspended within said passage between said tanks so that said plate upon becoming heated will provide a heat radiating surface.

5. In a boiler furnace having a combustion chamber, an outer tank having a substantially cylindrical inner shell and a plate closing the upper end of said shell defining the sides and the upper end of said combustion chamber, an inner tank arranged within the lower end of said shell, said inner tank having a pair of spaced apart side and lower end walls, said pair of side walls being joined together at their upper edges, aligned openings in said shell and the outer side wall of said inner tank, and connections between said openings spacing said inner tank from said shell and providing free circulation of fluid between said tanks, said pair of side walls of said inner tank having a variable height so that said joined upper edges provide a curved portion, said openings at the upper edges of said side walls being placed at portions the height of which is substantially a maximum so that steam formed between said sides may flow freely out said last-mentioned openings.

6. In a steam boiler furnace, the combination of a pair of concentric upright cylindrical shells having separate spaced apart plates closing the respective upper ends thereof and a single bottom end plate common to and closing the bottom ends thereof, a tubular conduit extending axially through said upper end plates to provide a fuel delivery passage therethrough, a second pair of upright cylindrical shells arranged concentrically within the inner of said first pair of shells having separate spaced apart bottom end plates closing the respective lower ends thereof, means closing the space between the upper ends of said second pair of shells, a tubular conduit extending axially through all of said bottom end plates providing a combustion air passage therethrough, the outer of said second pair of shells being spaced inwardly from the inner of said first pair of shells to provide an annular passage therebetween for the products of combustion and conduit means for withdrawing said products of combustion from the space between the bottom end plate for said first pair of shells and the lowermost end plate for said second pair of shells.

7. In a boiler furnace having a combustion chamber, an outer tank having a shell substantially surrounding said combustion chamber, one portion of said shell defining one end of said combustion chamber, an inner tank arranged within said shell, one portion of said inner tank defining the opposite end of said combustion chamber, said inner tank being so arranged within said shell as to provide a secondary chamber in the opposite end of said shell with respect to said combustion chamber, means including connections between said outer tank and said inner tank for spacing said tanks apart and providing passages between said combustion chamber and said secondary chamber, a metallic plate suspended within said passage between said tanks so that said plate upon becoming heated will provide a heat radiating surface, means for withdrawing products of combustion from said secondary chamber, and a combustion air intake passage in heat conductive relationship with said secondary chamber so that the air passing through said intake passage may be preheated before entering said combustion chamber.

8. A boiler furnace having a combustion chamber, a pair of interconnected complementary nested annular tanks for substantially enclosing said combustion chamber, each of said tanks having the outer wall thereof extending beyond the inner wall at one end thereof and each wall joined to a corresponding one of a pair of spaced apart annular plates having a central tube joined thereto to form an inwardly offset annular end drum for defining a corresponding end of said combustion chamber with the inner of said complementary tanks reversely nested in annular spaced apart relation within the outer tank and with the said central tubes thereof in alignment for supplying combustibles and air into said combustion chamber, an annular plate extending between the other end of said outer tank and the said central tube of said inner tank to provide a heat exchange chamber around said tube communicating with the annular space between said tanks for conducting the products of combustion from said combustion chamber, and a flue connection communicating with said heat exchange chamber.

9. A boiler furnace having a combustion chamber, an outer annular tank having a vertical axis and an inwardly offset annular drum at the upper end thereof and an annular heat conducting end plate at the lower end thereof for surrounding said combustion chamber with said end drum forming a water space over the upper end of said combustion chamber, a complementary inner annular tank reversely nested in concentric spaced apart relation within said outer tank and having an inwardly offset annular end drum at the bottom thereof to define the lower end of said combustion chamber with the said end drum of said inner tank in spaced apart relation with said heat conducting end plate of said outer tank to form therewith a heat exchange chamber communicating with said combustion chamber through the annular passage formed between said tanks, conduit means for providing fluid circulating connections between said tanks and for supporting said inner tank, and a flue connection communicating with said heat exchange chamber.

WILLIAM DALTON.